United States Patent
Vanmaele

[11] Patent Number: 5,565,403
[45] Date of Patent: Oct. 15, 1996

[54] DYE DONOR ELEMENT FOR USE IN A THERMAL DYE TRANSFER METHOD

[75] Inventor: Luc Vanmaele, Lochristi, Belgium

[73] Assignee: Agfa-Gevaert, Mortsel, Belgium

[21] Appl. No.: 428,888

[22] Filed: Apr. 25, 1995

[30] Foreign Application Priority Data

Jun. 13, 1994 [EP] European Pat. Off. ............ 94201683

[51] Int. Cl.$^6$ ............................ B41M 5/035; B41M 5/38
[52] U.S. Cl. ........................ 503/227; 428/195; 428/913; 428/914
[58] Field of Search .............................. 8/471; 428/195, 428/913, 914; 503/227

[56] References Cited

U.S. PATENT DOCUMENTS

| | | | |
|---|---|---|---|
| 3,219,470 | 11/1965 | Lässig | 117/36.8 |
| 5,084,571 | 1/1992 | Shimada | 428/195 |
| 5,187,145 | 2/1993 | Kanto et al. | 503/227 |
| 5,262,289 | 11/1993 | Ohya | 430/522 |

Primary Examiner—Bruce H. Hess
Attorney, Agent, or Firm—Brumbaugh, Graves, Donohue & Raymond

[57] ABSTRACT

The present invention provides a dye donor element comprising a dye according to the following general formula:

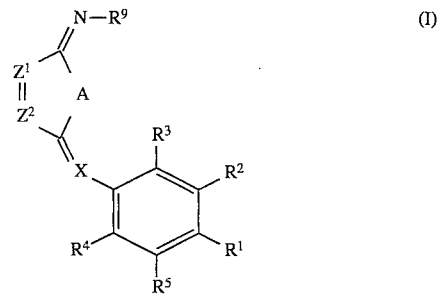

wherein the symbols have a meaning as defined in the claims and the description. The present invention further provides a thermal dye transfer process using such dye donor elements.

5 Claims, No Drawings

DYE DONOR ELEMENT FOR USE IN A THERMAL DYE TRANSFER METHOD

FIELD OF THE INVENTION

The present invention relates to dye-donor elements for use according to thermal dye sublimation transfer and to novel dyes for use in said dye-donor elements.

BACKGROUND OF THE INVENTION

Thermal dye sublimation transfer or thermal dye diffusion transfer is a recording method in which a dye-donor element provided with a dye layer containing sublimable dyes having heat transferability is brought into contact with a receiver sheet or receiver element and selectively, in accordance with a pattern information signal, is heated by means of a thermal printing head provided with a plurality of juxtaposed heat-generating resistors, whereby dye is transferred from the selectively heated regions of the dye-donor element to the receiver sheet and forms a pattern thereon, the shape and density of which are in accordance with the pattern and intensity of heat applied to the dye-donor element.

A dye-donor element for use according to thermal dye sublimation transfer usually comprises a very thin support e.g. a polyester support, one side of which is covered with a dye layer comprising the printing dyes. Usually, an adhesive or subbing layer is provided between the support and the dye layer. Normally, the opposite side is covered with a slipping layer that provides a lubricated surface against which the thermal printing head can pass without suffering abrasion. An adhesive layer may be provided between the support and the slipping layer.

The dye layer can be a monochromic dye layer or it may comprise sequential repeating areas of differently coloured dyes e.g. dyes having a cyan, magenta, yellow, and optionally black hue. When a dye-donor element containing three or more primary colour dyes is used, a multicolour image can be obtained by sequentially performing the dye transfer process steps for each colour.

A primary coloured dye layer e.g. a magenta or cyan or yellow dye layer may comprise only one primary coloured dye (a magenta, cyan or yellow dye respectively) or may comprise a mixture of two or more primary colour dyes of the same hue (two magenta, two cyan or two yellow dyes respectively).

Any dye can be used in such a dye layer provided it is easily transferable to the dye-image-receiving layer of the receiver sheet or element by the action of heat.

Typical and specific examples of dyes for use in thermal dye sublimation transfer have been described in e.g. EP 209,990, EP 209,991, EP 216,483, EP 218,397, EP 227,095, EP 227,096, EP 229,374, EP 235,939, EP 247,737, EP 257,577, EP 257,580, EP 258,856, EP 400,706, EP 279,330, EP 279,467, EP 285,665, U.S. Pat. No. 4,743,582, U.S. Pat. No. 4,753,922, U.S. Pat. No. 4,753,923, U.S. Pat. No. 4,757,046, U.S. Pat. No. 4,769,360, U.S. Pat. No. 4,771,035, U.S. Pat. No. 5,026,677. JP 84/78,894, JP 84/78,895, JP 84/78,896, JP 84/227,490, JP 84/227,948, JP 85/27,594, JP 85/30,391, JP 85/229,787, JP 85/229,789, JP 85/229,790, JP 85/229,791, JP 85/229,792, JP 85/229,793, JP 85/229,795, JP 86/41,596, JP 86/268,493, JP 86/268,494, JP 86/268,495, and JP 86/284,489.

In spite of the many dyes that already exist, there is still a continuous search for novel dyes and especially for dyes that are suited for use in dye-donor elements for thermal dye sublimation transfer printing, preferably dyes with low melting points and a good solubility in ecologically acceptable solvents.

SUMMARY OF THE INVENTION

It is therefore an object of the present invention to provide novel dye-donor elements for use according to thermal dye sublimation transfer printing.

It is another object of the present invention to provide novel dyes that can be used in said dye-donor elements.

Other objects will become apparent from the description hereinafter.

In accordance with the present invention a dye-donor element for use according to thermal dye sublimation transfer is provided, said dye-donor element comprising a support having thereon a dye layer comprising at least one dye, wherein said at least one dye corresponds to the following general formula (I):

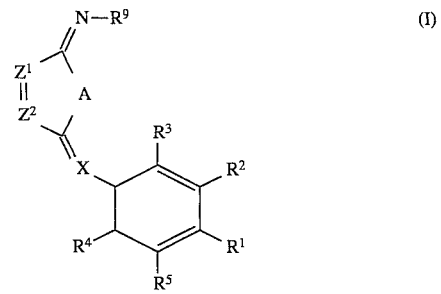

wherein $Z^1$ and $Z^2$ each independently represent N or $CR^6$;

A represents O, S or $NR^7$;

X represents N or $CR^8$—$(CR^{16}$=$CR^{17})_n$ wherein n is 0 or 1;

$R^2$, $R^3$, $R^4$ and $R^5$ each independently represent hydrogen, an alkyl, a cycloalkyl, an aryl, an alkylthio, an amino, an alkyloxy, an aryloxy, a carbonamido, a sulfamido, a hydroxy, a halogen, CN, $NO_2$, NH—$SO_2R^{10}$, NH—$COR^{10}$, O—$SO_2^{10}$, O—$COR^{10}$ or $R^2$ and $R^3$ together with the atoms to which they are attached or $R^4$ and $R^5$ together with the atoms to which they are attached represent the necessary atoms to form a ring:

$R^1$ represents $OR^{11}$ $SR^{11}$ or $NR^{12}R^{13}$;

$R^{11}$ represents hydrogen, an alkyl, a cycloalkyl or an aryl;

$R^{12}$ and $R^{13}$ each independently represents hydrogen, an alkyl, a cycloalkyl, an aryl, a heterocyclic ring or $R^{12}$ and $R^{13}$ together with the atoms to which they are attached represent the necessary atoms to form a heterocyclic ring or $R^{12}$ or $R^{13}$ together with $R^2$ or $R^5$ together with the atoms to which they are attached represent the necessary atoms to form a heterocyclic ring:

$R^6$ represents hydrogen, a hydroxy, a thiol, an oxycarbonyl group, an oxysulfonyl group, CN, $NO_2$, a halogen, an alkoxy, an aryloxy, an alkylthio, a carboxylic ester, a carbonamido group, an alkyl, an aryl, a cycloalkyl, a sulfonamido group, an amino, a heterocyclic group, an acylamino or a sulfonyl amino;

$R^7$ represents hydrogen, an alkyl, an aryl, a cycloalkyl, an acyl group, a sulfonyl group or a heterocyclic group:

$R^8$ represents hydrogen, cyano, an alkyl, a cycloalkyl, an aryl, a heterocyclic ring, an alkoxy, an alkylthio, an aryloxy, a halogen, $SO_2R^{10}$, $COR^{10}$, $CSR^{10}$ $POR^{10}R^{14}$ or $R^8$ and $R^3$ or $R^8$ and $R^4$ together with the atoms to which they are attached represent the necessary atoms to form a ring;

$R^9$ represents hydrogen, cyano, an aryl, an alkyl, a cycloalkyl, $SO_2R^{10}$, $COR^{10}$, $CSR^{10}$, $POR^{10}R^{14}$ or $COCOR^{10}$;

$R^{10}$ and $R^{14}$ each independently represent an alkyl, a cycloalkyl, an aryl, an alkenyl, an alkyloxy, an aryloxy, an alkylthio, an arylthio, an amino, a heterocyclic ring or $R^{10}$ and $R^{14}$ together with the atoms to which they are attached represent the necessary atoms to form a ring;

$R^{16}$ and $R^{17}$ each independently represent hydrogen, cyano, an alkyl, a cycloalkyl, an aryl, a heterocyclic ring, an alkylthio, an aryloxy, a halogen, $SO_2R^{10}$, $COR^{10}$, $CSR^{10}$ $POR^{10}R^{14}$ or $R^{16}$ and $R^3$ or $R^{17}$ and $R^3$ or $R^{16}$ and $R^4$ or $R^{17}$ and $R^4$ together with the atoms to which they are attached represent the necessary atoms to form a ring.

According to the present invention there are provided novel dyes according to the above general formula (I).

According to the present invention there is further provided a method for making an image according to the thermal dye transfer process comprising the steps of:

placing the dye layer of a dye donor element as defined above in face-to-face relationship with an dye-image receiving layer of a receiver sheet;

image-wise heating a thus obtained assemblage and separating said receiver sheet from said dye donor element.

DETAILED DESCRIPTION OF THE INVENTION

According to a preferred embodiment, the dyes of the present invention correspond to the following general formula (II)

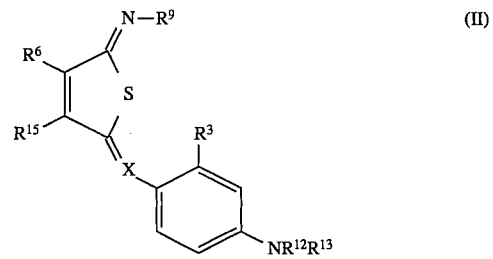

(II)

wherein $R^6$, $R^9$, $R^3$, $R^{12}$ and $R^{13}$ have the same meaning as defined in the above general formula (I) and $R^{15}$ represents hydrogen, a hydroxy, a thiol, an oxycarbonyl group, an oxysulfonyl group, CN, $NO_2$, a halogen, an alkoxy, an aryloxy, an alkylthio, a carboxylic ester, a carbonamido group, an alkyl, an aryl, a cycloalkyl, a sulfonamide, an amino, a heterocyclic group, an acylamino or a sulfonyl amino. Representatives of novel dyes corresponding to general formula (II) are listed in table 1 hereinafter but are not limited thereto.

TABLE 1

| Dye | $R^{12}$ | $R^{13}$ | $R^3$ | $R^6$ | $R^{15}$ | $R^9$ | X |
|---|---|---|---|---|---|---|---|
| A1 | $C_2H_5$ | $C_2H_5$ | H | CN | $OC_2H_5$ | H | CH |
| A2 | $C_2H_5$ | $C_2H_5$ | H | CN | OH | H | CH |
| A3 | $C_2H_5$ | $C_2H_5$ | H | CN | OH | $COCH_3$ | CH |
| A4 | $C_2H_5$ | $C_2H_5$ | H | CN | $OCOCH_3$ | $COCH_3$ | CH |
| A5 | $C_2H_5$ | $C_2H_5$ | H | CN | $OC_2H_5$ | $SO_2CH_3$ | N |
| A6 | $C_2H_5$ | $C_2H_5$ | H | CN | $OC_2H_5$ | $SO_2CH_3$ | N |
| A7 | $C_2H_5$ | $C_2H_5$ | $CH_3$ | CN | $OC_2H_5$ | $SO_2CH_3$ | N |
| A8 | $C_2H_5$ | $C_2H_5$ | $NHCOCH_3$ | CN | $OC_2H_5$ | $SO_2CH_3$ | N |
| A9 | $C_4H_9$ | $C_4H_9$ | H | CN | $OCH_3$ | $SO_2CH_3$ | N |
| A10 | $CH_3$ | $CH_3$ | H | CN | $OCH_3$ | $SO_2CH_3$ | N |
| A11 | $C_2H_5$ | $C_2H_5$ | H | CN | $OCH_3$ | $SO_2CH_3$ | N |
| A12 | $C_2H_5$ | $C_2H_5$ | $CH_3$ | CN | $OCH_3$ | $SO_2CH_3$ | N |
| A13 | $C_2H_5$ | $C_2H_5$ | H | CN | $OC_2H_5$ | $SO_2CH_3$ | N |
| A14 | $C_2H_5$ | $C_2H_5$ | $CH_3$ | CN | $OC_2H_5$ | $SO_2CH_3$ | N |
| A15 | $C_2H_5$ | $C_2H_5$ | H | CN | $OC_2H_5$ | $SO_2CH_3$ | N |
| A16 | $C_2H_5$ | $C_2H_5$ | $CH_3$ | CN | $OC_2H_5$ | $SO_2CH_3$ | N |
| A17 | $C_2H_5$ | $C_2H_5$ | $OCH_3$ | CN | $OC_2H_5$ | $SO_2CH_3$ | N |
| A18 | $C_2H_5$ | $C_2H_5$ | $N(CH_3)_2$ | CN | $OC_2H_5$ | $SO_2CH_3$ | N |
| A19 | $C_2H_5$ | $C_2H_5$ | H | CN | $OC_2H_5$ | $SO_2C_6H_5$ | N |
| A20 | $C_2H_5$ | $C_2H_5$ | $CH_3$ | CN | $OC_2H_5$ | $SO_2C_6H_5$ | N |
| A21 | $C_4H_9$ | $C_4H_9$ | H | CN | $OC_2H_5$ | $SO_2C_6H_5$ | N |
| A22 | $C_2H_5$ | $C_2H_5$ | $NHCOCH_3$ | CN | $OC_2H_5$ | $SO_2C_6H_5$ | N |
| A23 | $C_2H_5$ | $C_2H_5$ | $NHCOCH_3$ | CN | $OC_2H_5$ | F3 | N |
| A24 | $C_2H_5$ | $C_2H_5$ | H | CN | $OC_2H_5$ | F3 | N |
| A25 | $C_2H_5$ | $C_{12}H_{15}$ | $CH_3$ | CN | $OC_2H_5$ | F3 | N |
| A26 | $C_2H_5$ | $C_2H_5$ | $CH_3$ | CN | $OC_2H_5$ | F3 | N |
| A27 | $C_4H_9$ | $C_4H_9$ | $CH_3$ | CN | $OC_2H_5$ | F3 | N |
| A28 | $C_4H_9$ | $C_4H_9$ | H | CN | $OC_2H_5$ | F3 | N |
| A29 | $C_2H_5$ | $C_2H_5$ | H | CN | $OC_2H_5$ | $COCH_3$ | N |
| A30 | $C_2H_5$ | $C_2H_5$ | $CH_3$ | CN | $OC_2H_5$ | $COCH_3$ | N |
| A31 | $C_4H_9$ | $C_4H_9$ | H | CN | $OC_2H_5$ | $COCH_3$ | N |
| A32 | $C_2H_5$ | $C_2H_5$ | H | CN | $OC_2H_5$ | $COCO_2C_2H_5$ | N |
| A33 | $C_2H_5$ | $C_2H_5$ | H | CN | $OC_2H_5$ | F6 | N |
| A34 | $C_2H_5$ | $C_2H_5$ | H | CN | $OC_2H_5$ | $PO(OCH_3)_2$ | N |
| A35 | $C_2H_5$ | $C_2H_5$ | $NHCOCH_3$ | CN | $OC_2H_5$ | CN | N |
| A36 | $C_2H_5$ | $C_2H_5$ | H | CN | $OC_2H_5$ | F3 | CH |
| A37 | $C_2H_5$ | $C_2H_5$ | $CH_3$ | CN | $OC_2H_5$ | F3 | CH |
| A38 | $C_2H_5$ | $C_2H_5$ | $NHCOCH_3$ | CN | $OC_2H_5$ | F3 | CH |
| A39 | $C_2H_5$ | $C_2H_5$ | $OC_2H_5$ | CN | $OC_2H_5$ | F3 | CH |
| A40 | $C_4H_9$ | F5 | H | CN | $OC_2H_5$ | F3 | CH |
| A41 | $C_2H_5$ | $C_2H_5$ | H | CN | $OC_2H_5$ | F3 | CH |

TABLE 1-continued

| Dye | $R^{12}$ | $R^{13}$ | $R^3$ | $R^6$ | $R^{15}$ | $R^9$ | X |
|---|---|---|---|---|---|---|---|
| A42 | $C_2H_5$ | $C_2H_5$ | H | CN | $OC_2H_5$ | $SO_2C_6H_5$ | CH |
| A43 | $C_2H_5$ | $C_2H_5$ | H | CN | $OC_2H_5$ | $SO_2CH_3$ | CH |
| A44 | $C_2H_5$ | $C_2H_5$ | H | CN | $OC_2H_5$ | $COCH_3$ | CH |
| A45 | $C_2H_5$ | $C_2H_5$ | H | CN | $OC_2H_5$ | $COCO_2C_2H_5$ | CH |
| A46 | $C_2H_5$ | $C_2H_5$ | H | CN | $OC_2H_5$ | CN | CH |
| A47 | $C_2H_5$ | $C_2H_5$ | H | CN | $OC_2H_5$ | $SO_2C_6H_5$ | F4 |
| A48 | $C_2H_5$ | $C_2H_5$ | H | CN | $OC_2H_5$ | $SO_2CH_3$ | C(CN) |
| A49 | $C_4H_9$ | $C_4H_9$ | $CH_3$ | CN | $OC_2H_5$ | $SO_2C_6H_5$ | CH |
| A50 | $C_4H_9$ | $C_4H_9$ | $CH_3$ | CN | $OC_2H_5$ | $SO_2C_6H_5$ | C(CN) |
| A51 | $C_4H_9$ | $C_4H_9$ | $OCH_3$ | CN | $OC_2H_5$ | $SO_2C_6H_5$ | C(CN) |
| A52 | $C_4H_9$ | $C_4H_9$ | $OCH_3$ | CN | $OC_2H_5$ | $SO_2C_6H_5$ | CH |
| A53 | $C_4H_9$ | F5 | H | CN | $OC_2H_5$ | $SO_2C_6H_5$ | N |
| A54 | $C_4H_9$ | F5 | $CH_3$ | CN | $OC_2H_5$ | $SO_2C_6H_5$ | N |
| A55 | $C_4H_9$ | $C_4H_9$ | H | CN | $OC_2H_5$ | $SO_2C_6H_5$ | N |
| A56 | $C_2H_5$ | $C_2H_5$ | $CH_3$ | CN | $OC_2H_5$ | $SO_2C_6H_5$ | N |
| A57 | $C_2H_5$ | $C_2H_5$ | H | CN | $OC_2H_5$ | $SO_2C_6H_5$ | N |
| A58 | $C_2H_5$ | $C_2H_5$ | H | CN | $OC_2H_5$ | F3 | CH |
| A59 | $C_2H_5$ | $C_2H_5$ | $CH_3$ | CN | $OC_2H_5$ | F3 | CH |
| A60 | $C_2H_5$ | $C_2H_5$ | $CH_3$ | CN | $OC_2H_5$ | F3 | C(CN) |
| A61 | $C_2H_5$ | $C_2H_5$ | H | CN | $OC_2H_5$ | F3 | C(CN) |
| A62 | $C_2H_5$ | $C_2H_5$ | H | $CO_2C_2H_5$ | $OC_2H_5$ | $SO_2C_6H_5$ | CH |
| A63 | $C_2H_5$ | $C_2H_5$ | H | $CO_2C_2H_5$ | $OC_2H_5$ | $SO_2C_6H_5$ | C(CN) |
| A64 | $C_2H_5$ | $C_2H_5$ | H | $CO_2CH_3$ | $SCH_3$ | $SO_2C_6H_5$ | CH |
| A65 | $C_2H_5$ | $C_2H_5$ | H | CN | $SCH_3$ | $SO_2C_6H_5$ | CH |
| A66 | $C_2H_5$ | $C_2H_5$ | H | CN | $SCH_3$ | $SO_2C_6H_5$ | C(CN) |
| A67 | $C_2H_5$ | $C_2H_5$ | H | CN | $SCH_3$ | $SO_2C_6H_5$ | N |
| A68 | $C_2H_5$ | $C_2H_5$ | $CH_3$ | CN | $SCH_3$ | $SO_2C_6H_5$ | N |
| A69 | $C_2H_5$ | $C_2H_5$ | H | CN | $C_6H_5$ | $SO_2C_6H_5$ | N |
| A70 | $C_2H_5$ | $C_2H_5$ | H | $CO_2CH_3$ | $C_6H_5$ | $SO_2C_6H_5$ | N |
| A71 | $C_2H_5$ | $C_2H_5$ | H | CN | CN | $SO_2C_6H_5$ | N |
| A72 | $C_2H_5$ | $C_2H_5$ | H | CN | $C_6H_5$ | $SO_2C_6H_5$ | CH |
| A73 | $C_2H_5$ | $C_2H_5$ | H | $CO_2CH_3$ | $C_6H_5$ | $SO_2C_6H_5$ | CH |
| A74 | $C_2H_5$ | $C_2H_5$ | H | CN | CN | $SO_2C_6H_5$ | CH |
| A75 | $C_2H_5$ | $C_2H_5$ | H | CN | $C_6H_5$ | $SO_2C_6H_5$ | C(CN) |
| A76 | $C_2H_5$ | $C_2H_5$ | H | $CO_2CH_3$ | $C_6H_5$ | $SO_2C_6H_5$ | C(CN) |
| A77 | $C_2H_5$ | $C_2H_5$ | H | CN | CN | $SO_2C_6H_5$ | C(CN) |
| A78 | $C_2H_5$ | $C_2H_5$ | $CH_3$ | CN | $C_6H_5$ | $SO_2C_6H_5$ | N |
| A79 | $C_2H_5$ | $C_2H_5$ | $CH_3$ | $CO_2CH_3$ | $C_6H_5$ | $SO_2C_6H_5$ | N |
| A80 | $C_2H_5$ | $C_2H_5$ | $CH_3$ | CN | CN | $SO_2C_6H_5$ | N |
| A81 | $C_2H_5$ | $C_2H_5$ | $CH_3$ | CN | $C_6H_5$ | $SO_2C_6H_5$ | CH |
| A82 | $C_2H_5$ | $C_2H_5$ | $CH_3$ | $CO_2CH_3$ | $C_6H_5$ | $SO_2C_6H_5$ | CH |
| A83 | $C_2H_5$ | $C_2H_5$ | $CH_3$ | CN | CN | $SO_2C_6H_5$ | CH |
| A84 | $C_2H_5$ | $C_2H_5$ | $CH_3$ | CN | $C_6H_5$ | $SO_2C_6H_5$ | C(CN) |
| A85 | $C_2H_5$ | $C_2H_5$ | $CH_3$ | $CO_2CH_3$ | $C_6H_5$ | $SO_2C_6H_5$ | C(CN) |
| A86 | $C_2H_5$ | $C_2H_5$ | $CH_3$ | CN | CN | $SO_2C_6H_5$ | C(CN) |
| A87 | $C_2H_5$ | $C_2H_5$ | $CH_3$ | CN | $OC_2H_5$ | F1 | N |
| A88 | $C_2H_5$ | $C_2H_5$ | H | CN | $OC_2H_5$ | F1 | N |
| A89 | $C_2H_5$ | $C_2H_5$ | H | CN | $OC_2H_5$ | F1 | CH |
| A90 | $C_2H_5$ | $C_2H_5$ | H | CN | $OC_2H_5$ | F1 | C(CN) |

A91

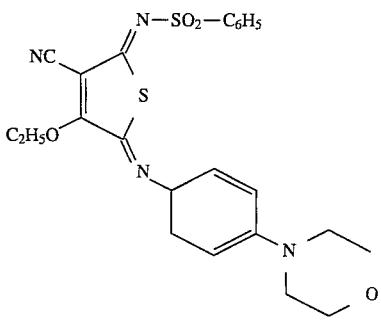

TABLE 1-continued

| Dye | R¹² | R¹³ | R³ | R⁶ | R¹⁵ | R⁹ | X |
|---|---|---|---|---|---|---|---|
| A92 | | | | (structure: thiophene with NC, C₂H₅O, =N–SO₂–C₆H₅, and =N-linked 1-methyl-1,2,3,4-tetrahydroquinolin-6-yl) | | | |
| A93 | | | | (structure: thiophene with NC, C₂H₅O, =N–SO₂–C₆H₄–CH₃ (p-tolyl), and =N-linked julolidine) | | | |
| A94 | | | | (structure: thiophene with NC, C₂H₅O, =N–SO₂CH₃, and =CH–C₆H₄–piperidinyl) | | | |
| A95 | | | | (structure: thiophene with NC, C₂H₅O, =N–SO₂CH₃, and =C(CN)–C₆H₄–piperidinyl) | | | |

TABLE 1-continued

| Dye | R¹² | R¹³ | R³ | R⁶ | R¹⁵ | R⁹ | X |
|-----|-----|-----|-----|-----|-----|-----|---|
| A96 | | | | | | | |

[Structure of A96 showing thiazole ring with NC, C₆H₅, N-SO₂-C₆H₅ groups, connected via N to phenyl with morpholino group]

According to another embodiment, the dyes of the present invention correspond to the following general formula (III)

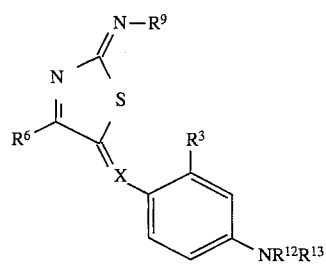

wherein $R^6$, $R^9$, $R^3$, $R^{12}$ and $R^{13}$ have the same meaning as defined in the above general formula (I).

Representatives of novel dyes corresponding to general formula (III) are listed in table 2 hereinafter but are not limited thereto.

TABLE 2

| Dye | R¹² | R¹³ | R³ | R⁶ | R⁹ | X |
|-----|-----|-----|-----|-----|-----|---|
| B1 | C₂H₅ | C₂H₅ | H | H | SO₂CH₃ | N |
| B2 | C₂H₅ | C₂H₅ | H | F2 | SO₂CH₃ | N |
| B3 | C₂H₅ | C₂H₅ | CH₃ | F2 | SO₂CH₃ | N |
| B4 | C₂H₅ | C₂H₅ | NHCOCH₃ | F2 | SO₂CH₃ | N |
| B5 | C₄H₉ | C₄H₉ | H | F2 | SO₂CH₃ | N |
| B6 | CH₃ | CH₃ | H | F2 | SO₂CH₃ | N |
| B7 | C₂H₅ | C₂H₅ | H | C₆H₅ | SO₂CH₃ | N |
| B8 | C₂H₅ | C₂H₅ | CH₃ | C₆H₅ | SO₂CH₃ | N |
| B9 | C₂H₅ | C₂H₅ | H | CH₃ | SO₂CH₃ | N |
| B10 | C₂H₅ | C₂H₅ | CH₃ | CH₃ | SO₂CH₃ | N |
| B11 | C₂H₅ | C₂H₅ | NHCOCH₃ | C₆H₅ | SO₂CH₃ | N |
| B12 | C₂H₅ | C₂H₅ | CH₃ | OCH₃ | SO₂CH₃ | N |
| B13 | C₂H₅ | C₂H₅ | OCH₃ | C₆H₅ | SO₂CH₃ | N |
| B14 | C₂H₅ | C₂H₅ | N(CH₃)₂ | C₆H₅ | SO₂CH₃ | N |
| B15 | C₂H₅ | C₂H₅ | H | F2 | SO₂C₆H₅ | N |
| B16 | C₂H₅ | C₂H₅ | CH₃ | F2 | SO₂C₆H₅ | N |
| B17 | C₄H₉ | C₄H₉ | H | F2 | SO₂C₆H₅ | N |
| B18 | C₂H₅ | C₂H₅ | NHCOCH₃ | F2 | SO₂C₆H₅ | N |
| B19 | C₂H₅ | C₂H₅ | NHCOCH₃ | C₆H₅ | F3 | N |
| B20 | C₂H₅ | C₂H₅ | H | C₆H₅ | F3 | N |
| B21 | C₂H₅ | C₁₂H₂₅ | CH₃ | C₆H₅ | F3 | N |
| B22 | C₂H₅ | C₂H₅ | CH₃ | C₆H₅ | F3 | N |
| B23 | C₄H₉ | C₄H₉ | CH₃ | C₆H₅ | F3 | N |
| B24 | C₄H₉ | C₄H₉ | H | C₆H₅ | F3 | N |
| B25 | C₂H₅ | C₂H₅ | H | C₆H₅ | SO₂C₆H₅ | N |
| B26 | C₂H₅ | C₂H₅ | CH₃ | C₆H₅ | COCH₃ | N |
| B27 | C₄H₉ | C₄H₉ | CH₃ | C₆H₅ | SO₂CH₃ | N |
| B28 | C₂H₅ | C₂H₅ | H | C₆H₅ | COCO₂C₂H₅ | N |

TABLE 2-continued

| Dye | R¹² | R¹³ | R³ | R⁶ | R⁹ | X |
|-----|-----|-----|-----|-----|-----|---|
| B29 | C₂H₅ | C₂H₅ | H | C₆H₅ | F6 | N |
| B30 | C₂H₅ | C₂H₅ | H | C₆H₅ | PO(OCH₃)₂ | N |
| B31 | C₂H₅ | C₂H₅ | NHCOCH₃ | C₆H₅ | CN | N |
| B32 | C₂H₅ | C₂H₅ | H | C₆H₅ | F3 | CH |
| B33 | C₂H₅ | C₂H₅ | CH₃ | C₆H₅ | F3 | CH |
| B34 | C₂H₅ | C₂H₅ | NHCOCH₃ | C₆H₅ | F3 | CH |
| B35 | C₂H₅ | C₂H₅ | OC₂H₅ | C₆H₅ | F3 | CH |
| B36 | C₄H₉ | F5 | H | C₆H₅ | F3 | CH |
| B37 | C₂H₅ | C₂H₅ | H | F2 | F3 | CH |
| B38 | C₂H₅ | C₂H₅ | H | C₆H₅ | SO₂C₆H₅ | CH |
| B39 | C₂H₅ | C₂H₅ | H | C₆H₅ | SO₂C₆H₅ | CH |
| B40 | C₂H₅ | C₂H₅ | H | C₆H₅ | COCH₃ | CH |
| B41 | C₂H₅ | C₂H₅ | H | C₆H₅ | COCO₂C₂H₅ | CH |
| B42 | C₂H₅ | C₂H₅ | H | C₆H₅ | CN | CH |
| B43 | C₂H₅ | C₂H₅ | H | C₆H₅ | SO₂C₆H₅ | F4 |
| B44 | C₂H₅ | C₂H₅ | H | C₆H₅ | SO₂C₆H₅ | C(CN) |
| B45 | C₄H₉ | C₄H₉ | CH₃ | C₆H₅ | SO₂C₆H₅ | CH |
| B46 | C₄H₉ | C₄H₉ | CH₃ | C₆H₅ | SO₂C₆H₅ | C(CN) |
| B47 | C₄H₉ | C₄H₉ | OCH₃ | C₆H₅ | SO₂C₆H₅ | C(CN) |
| B48 | C₄H₉ | C₄H₉ | OCH₃ | C₆H₅ | SO₂C₆H₅ | CH |
| B49 | C₄H₉ | F5 | H | C₆H₅ | SO₂C₆H₅ | N |
| B50 | C₄H₉ | F5 | CH₃ | C₆H₅ | SO₂C₆H₅ | N |
| B51 | C₄H₉ | C₄H₉ | H | C₆H₅ | SO₂C₆H₅ | N |
| B52 | C₂H₅ | C₂H₅ | CH₃ | H | SO₂C₆H₅ | N |
| B53 | C₂H₅ | C₂H₅ | H | H | SO₂C₆H₅ | N |
| B54 | C₂H₅ | C₂H₅ | H | H | F3 | CH |
| B55 | C₂H₅ | C₂H₅ | CH₃ | H | F3 | CH |
| B56 | C₂H₅ | C₂H₅ | CH₃ | H | F3 | C(CN) |
| B57 | C₂H₅ | C₂H₅ | H | H | F3 | C(CN) |
| B58 | C₂H₅ | C₂H₅ | H | C₆H₅ | F1 | N |
| B59 | C₂H₅ | C₂H₅ | CH₃ | C₆H₅ | F1 | N |
| B60 | C₂H₅ | C₂H₅ | H | C₆H₅ | F1 | CH |
| B61 | C₂H₅ | C₂H₅ | H | C₆H₅ | F3 | C(CN) |
| B62 | C₂H₅ | C₂H₅ | H | C₆H₅ | CN | N |
| B63 | | | | | | |

[Structure of B63 showing thiazole ring with C₆H₅, N-SO₂-C₆H₅ groups, connected via N to cyclohexylidene with N-ethyl-morpholino-type group]

TABLE 2-continued

| Dye | R¹² | R¹³ | R³ | R⁶ | R⁹ | X |
|-----|-----|-----|-----|-----|-----|---|

B64, B65, B66, B67, B68, B69: [chemical structures shown]

In the above tables the symbols F1 to F5 represent respectively the following fragments ("*" denotes the linking position):

F1: [furan-2-sulfonyl fragment, *SO₂-furan]

F2: [nitrophenyl fragment, *-C₆H₄-NO₂]

F3: [*SO₂-C₆H₄-CH₃ (p-tolylsulfonyl)]

F4: [*C(=O)-C₆H₄-N(C₂H₅)₂]

F5: [*CH(CH₃)(CH₂CH₃) isobutyl-type]

F6: [*C(=O)-C(=O)-N(CH₂CH₂CH₃)₂ type, with two propyl groups on N]

According to another embodiment, the dyes of the present invention correspond to the following general formula (IV), (V), (VI) or (VII):

$$\text{(IV)}$$

[Structure showing thiadiazole with N—R⁹, N=N, S, connected via X to phenyl bearing R³ and NR¹²R¹³]

(V)
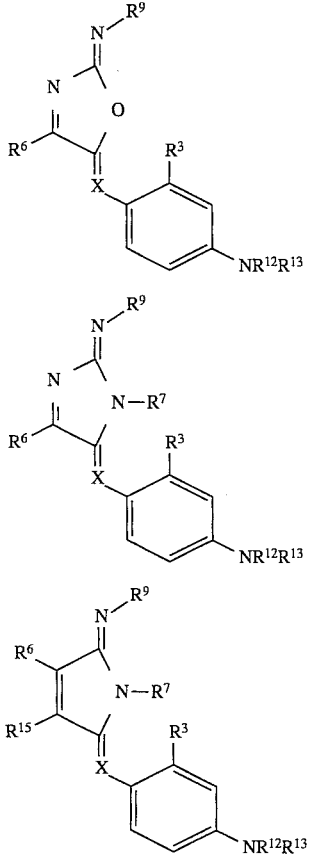
(VI)
(VII)
In the above formulas (IV) to (VII) $R^3$, $R^6$, $R^7$, $R^{12}$, $R^{13}$, $R^{15}$ and $R^9$ have the same meaning as defined in the above general formulas (I) and (II).
Representatives of novel dyes corresponding to general formula (IV), (V), (VI) or (VII) are listed in table 3 hereinafter but are not limited thereto.
Table 3
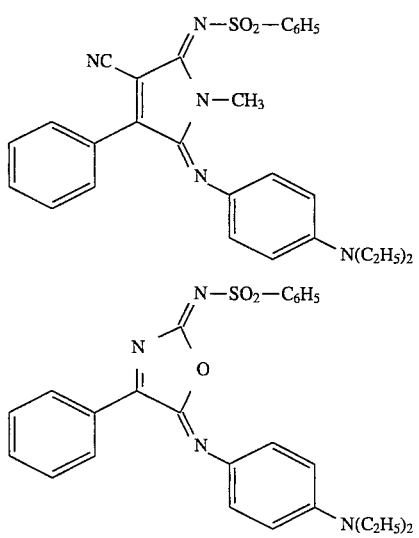 D1
D2
Table 3
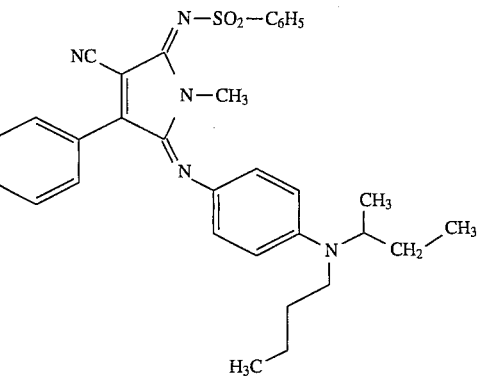 D3
D4
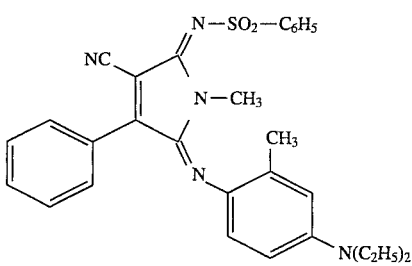 
D5
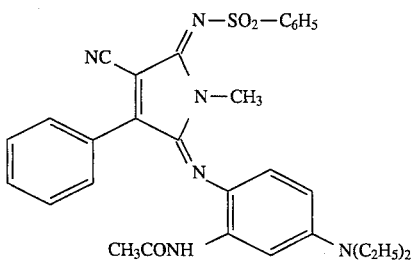
D6
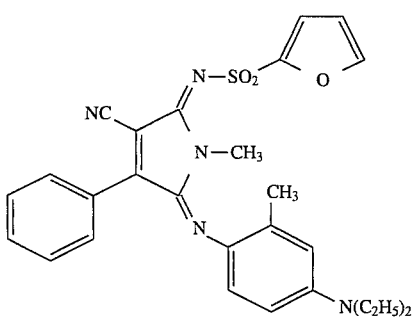

-continued
Table 3
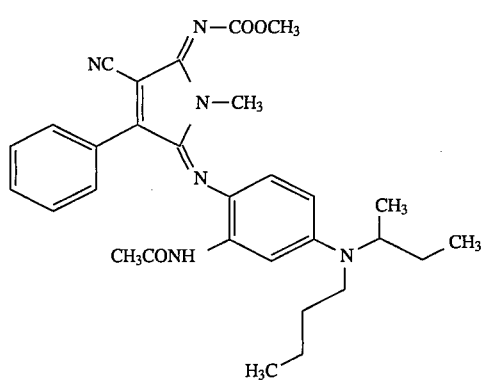 D7
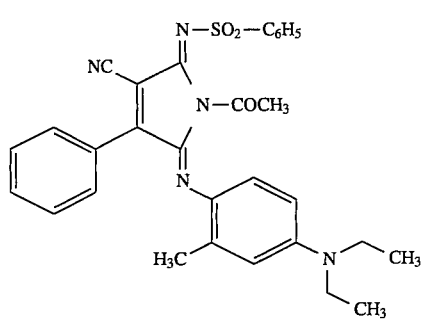 D8
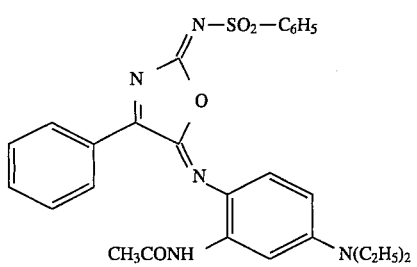 D9
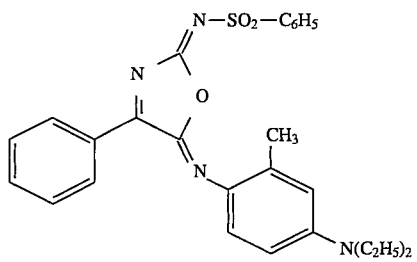 D10
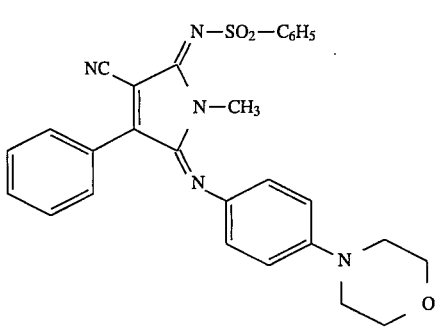 D11
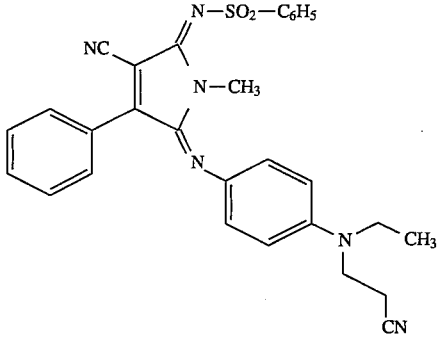 D12
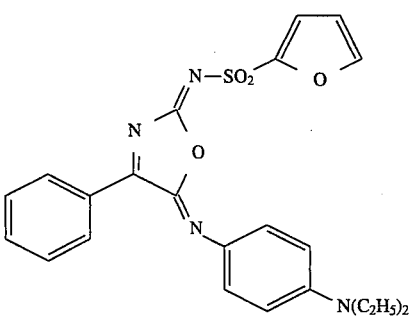 D13
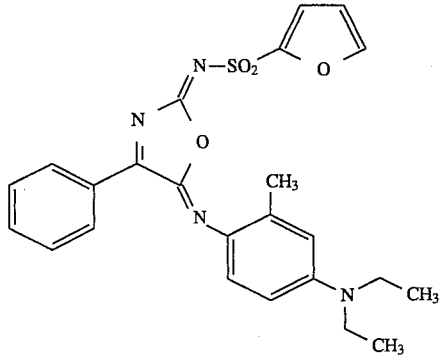 D14
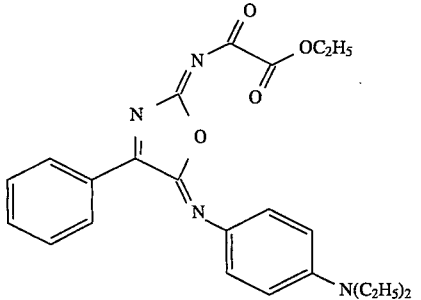 D15
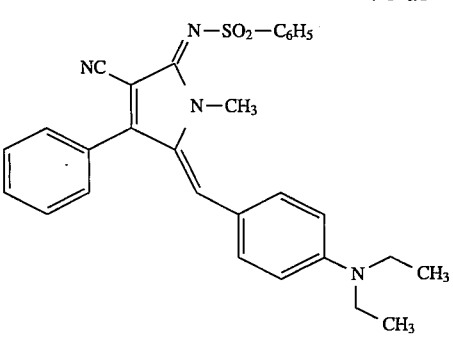 D16

-continued
Table 3
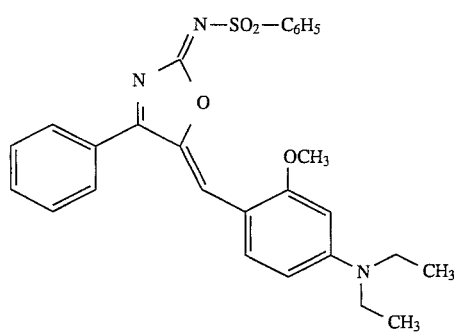 D17
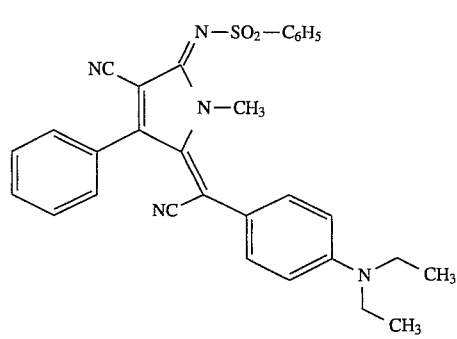 D18
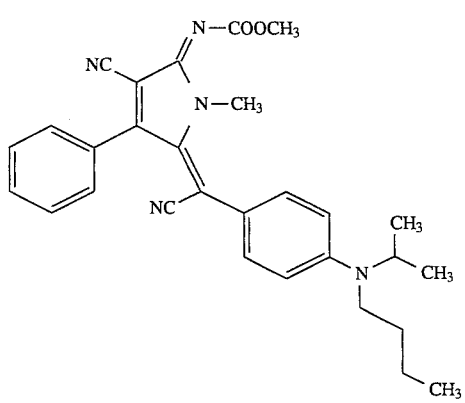 D19
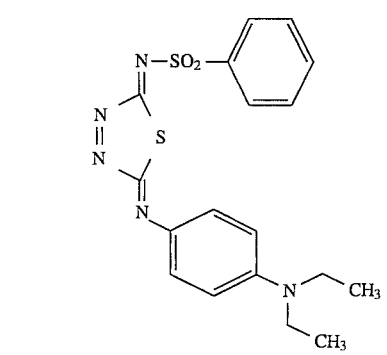 D20
-continued
Table 3
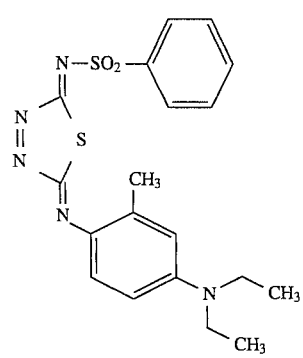 D21
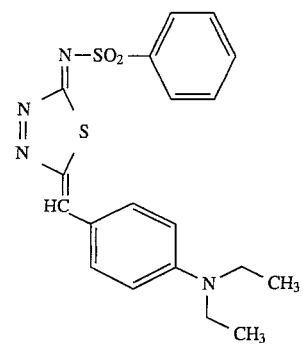 D22
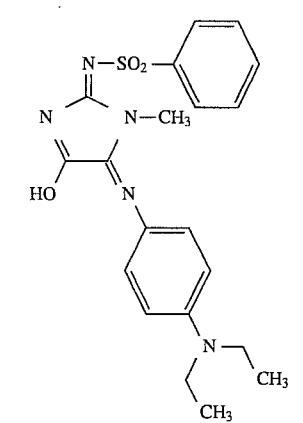 D23
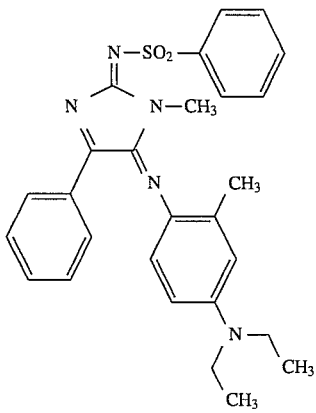 D24

-continued
Table 3

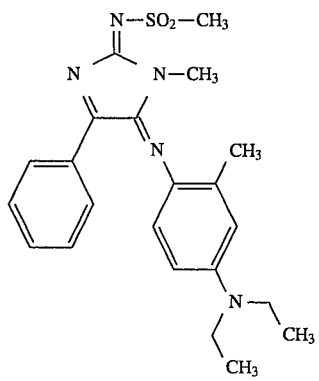
D25

The dyes according to the present invention have a cyan, magenta, or yellow hue or absorb in the UV or IR-region, and have a good solubility in ecologically acceptable organic solvents such as e.g. ethyl acetate and ethyl methyl ketone. Dyes according to the present invention absorbing in the IR-region, i.e. above 700 nm, are suitable as light-stabilisers for a dye image formed in accordance with the present invention.

The dyes of formula (I) can be prepared by well known chemical synthetic techniques, for example, by a condensation reaction between a nucleus of general formula (VIII) and a formyl compound of general formula (IX) or a nitroso compound of general formula (X). Another method of preparation is the oxidative coupling between the nucleus (VIII) and a paraphenyleendiamine.

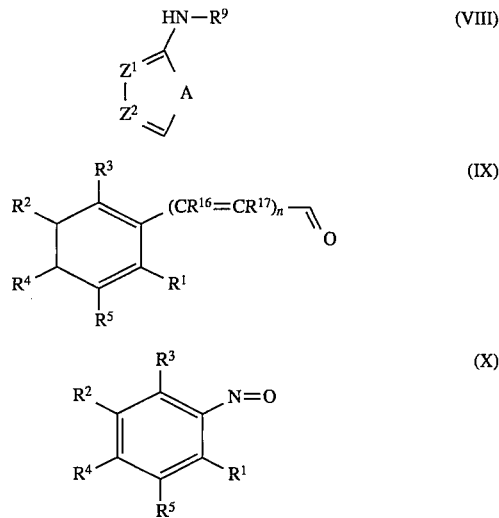

wherein $R^1$ to $R^5$, $R^9$, $Z^1$, $Z^2$, A, $R^{16}$, $R^{17}$ and n have the same meaning as defined in the above formulas (I) and (II).

Examples of nuclei of general formula (VIII) are thiazoles, imidazoles, oxazoles, thiophenes, pyrroles, thiadiazoles etc. The synthesis of nuclei of general formula (VIII) is well known in chemical literature e.g. "The chemistry of heterocyclic compounds" A series of monographs, Wiley & Sons; Pyrroles, Part one and two, edited by R. Alan Jones (Wiley & Sons); Thiazole and its derivatives Part two, edited by J. V. Metzger (Wiley & Sons): Z. Chem. 27(7), pages 258– 259 (1987): GB 1497537: Handbook of Heterocyclic Chemistry, Alan R. Katritzky, Pergamon Press (1985): EP 193885. The synthesis of dyes according to formula (I) is described below in further detail in the examples.

The dyes corresponding to the general formulas (I) to (VII) defined above can be used in inkjer printing, resistive ribbon printing, in inks e.g. for laser applications, in textile, in lacquers, and in paints. They can also be used for transfer printing on fabrics and for constructing filter array elements. According to a preferred embodiment of the present invention the dyes are used in the dye layer of a dye-donor element for thermal dye sublimation transfer.

To improve the stability of the dyes to light, the use of a metal complex of the dye e.g. a Ni or Co complex is also effective.

The dye layer is formed preferably by adding the dyes, the polymeric binder medium, and other optional components to a suitable solvent or solvent mixture, dissolving or dispersing the ingredients to form a coating composition that is applied to a support, which may have been provided first with an adhesive or subbing layer, and dried.

The dye layer thus formed has a thickness of about 0.2 to 5.0 μm, preferably 0.4 to 2.0 μm, and the amount ratio of dye to binder ranges from 9:1 to 1:3 by weight, preferably from 2:1 to 1:2 by weight.

As polymeric binder the following can be used : cellulose derivatives, such as ethyl cellulose, hydroxyethyl cellulose, ethylhydroxy cellulose, ethylhydroxyethyl cellulose, hydroxypropyl cellulose, methyl cellulose, cellulose nitrate, cellulose acetate formate, cellulose acetate hydrogen phthalate, cellulose acetate, cellulose acetate propionate, cellulose acetate butyrate, cellulose acetate pentanoate, cellulose acetate benzoate, cellulose triacetate; vinyl-type resins and derivatives, such as polyvinyl alcohol, polyvinyl acetate, polyvinyl butyral, copolyvinyl butyral-vinyl acetal-vinyl alcohol, polyvinyl pyrrolidone, polyvinyl acetoacetal, polyacrylamide; polymers and copolymers derived from acrylates and acrylate derivatives, such as polyacrylic acid, polymethyl methacrylate and styrene-acrylate copolymers; polyester resins; polycarbonates; copolystyrene-acrylonitrile; polysulfones; polyphenylene oxide; organosilicones, such as polysiloxanes; epoxy resins and natural resins, such as gum arabic. Preferably, the binder for the dye layer of the present invention comprises cellulose acetate butyrate of copolystyrene-acrylonitrile.

The dyes in accordance with the present invention may be used in admixture with other known dyes for thermal sublimation printing. In particular they can be used in combination with tricyano- and dicyanovinyl dyes as disclosed in EP 92203566, EP 92203208 and with malononitrile dimer derived dyes as disclosed in EP-A-400706. The present dyes may also be used in admixture with azo dyes e.g. disperse azo dyes, anthraquinone dyes, indoaniline dyes, azomethine dyes. Examples of dyes that can be used in combination with the dyes of the present invention are disclosed in e.g. EP 92203979, EP 209,990, EP 209,991, EP 216,483, EP 218,397, EP 227,095, EP 227,096, EP 229,374, EP 235,939, EP 247,737, EP 257,577, EP 257,580, EP 258,856, EP 279,330, EP 279,467, EP 285,665, EP 400,706, U.S. Pat. No. 4,743,582, U.S. Pat. No. 4,753,922. U.S. Pat. No. 4,753,923, U.S. Pat. No 4,757,046, U.S. Pat. Nos. 4,769,360, U.S. Pat. No. 4.771,035, U.S. Pat. No. 5,026,677, JP 84/78,894, JP 84/78,895, JP 84/78,896, JP 84/227,490, JP 84/227,948, JP 85/27,594, JP 85/30,391, JP 85/229,787, JP 85/229,789, JP 85/229,790, JP 85/229,791, JP 85/229,792, JP 85/229,793, JP 85/229,795, JP 86/41,596, JP 86/268,493, JP 86/268,494, JP 86/268,495, and JP 86/284,489, U.S. Pat. Nos. 4,839,336, U.S. Pat. No. 5,168.094, U.S. Pat. No. 5,147,844, U.S. Pat. No. 5,177,052, U.S. Pat. No. 5,175,069, U.S. Pat. No. 5,155,088, U.S. Pat. No. 5,166,124, U.S. Pat. No. 5,166,129, U.S. Pat. No. 5,166,128, U.S. Pat. No. 5,134,115, U.S. Pat. No. 1,132,276. U.S. Pat. No. 1,132,275, U.S. Pat. No. 5,132,274, U.S. Pat. No. 5,132,273, U.S. Pat.

No. 5,132,268, U.S. Pat. No. 5,132,267, U.S. Pat. No. 5,126,314, U.S. Pat. No. 5,126,313, U.S. Pat. No. 5,126,312, U.S. Pat. No. 5,126,311, U.S. Pat. No. 5,134,116, U.S. Pat. No. 4,975,410, U.S. Pat. No. 4,885,272, U.S. Pat. No. 4,886,029, etc.

The coating layer may also contain other additives, such as curing agents, preservatives, organic or inorganic fine particles, dispersing agents, antistatic agents, defoaming agents, viscosity-controlling agents, these and other ingredients have been described more fully in EP 133,011, EP 133,012, EP 111,004, and EP 279,467.

Any material can be used as the support for the dye-donor element provided it is dimensionally stable and capable of withstanding the temperatures involved, up to 400° C. over a period of up to 20 msec, and is yet thin enough to transmit heat applied on one side through to the dye on the other side to effect transfer to the receiver sheet within such short periods, typically from 1 to 10 msec. Such materials include polyesters such as polyethylene terephthalate, polyamides, polyacrylates, polycarbonates, cellulose esters, fluorinated polymers, polyethers, polyacetals, polyolefins, polyimides, glassine paper and condenser paper. Preference is given to a support comprising polyethylene terephthalate. In general, the support has a thickness of 2 to 30 μm. The support may also be coated with an adhesive or subbing layer, if desired.

The dye layer of the dye-donor element may be coated on the support or printed thereon by a printing technique such as a gravure process.

A dye barrier layer comprising a hydrophilic polymer may also be employed between the support and the dye layer of the dye-donor element to enhance the dye transfer densities by preventing wrong-way transfer of dye backwards to the support. The dye barrier layer may contain any hydrophilic material that is useful for the intended purpose. In general, good results have been obtained with gelatin, polyacrylamide. polyisopropyl acrylamide, butyl methacrylate-grafted gelatin, ethyl methacrylate-grafted gelatin, ethyl acrlate-grafted gelatin, cellulose monoacetate, methylcellulose, polyvinyl alcohol, polyethyleneimine, polyacrylic acid, a mixture of polyvinyl alcohol and polyvinyl acetate, a mixture of polyvinyl alcohol and polyacrylic acid, or a mixture of cellulose monoacetate and polyacrylic acid. Suitable dye barrier layers have been described in e.g. EP 227091 and EP 228065. Certain hydrophilic polymers, e.g. those described in EP 227091, also have an adequate adhesion to the support and the dye layer, so that the need for a separate adhesive or subbing layer is avoided. These particular hydrophilic polymers used in a single layer in the dye-donor element thus perform a dual function, hence are referred to as dye-barrier/subbing layers.

Preferably the reverse side of the dye-donor element has been coated with a slipping layer to prevent the printing head from sticking to the dye-donor element. Such a slipping layer would comprise a lubricating material such as a surface active agent, a liquid lubricant, a solid lubricant or mixtures thereof, with or without a polymeric binder. The surface-active agents may be any agents known in the art such as carboxylates, sulfonates, phosphates, aliphatic amine salts, aliphatic quaternary ammonium salts, polyoxyethylene alkyl ethers, polyethylene glycol fatty acid esters, fluoroalkyl C2-C20 aliphatic acids. Examples of liquid lubricants include silicone oils, synthetic oils, saturated hydrocarbons and glycols. Examples of solid lubricants include various higher alcohols such as stearyl alcohol, fatty acids and fatty acid esters. Suitable slipping layers have been described in e.g. EP 138483, EP 227090, U.S. Pat. No. 4,567,113, U.S. Pat. No. 4,572,860, U.S. Pat. No. 4,717,711.

Preferably the slipping layer comprises a styreneoacrylonitrile copolymer or a styrene-acrylonitrile-butadiene copolymer or a mixture thereof or a polycarbonate as described in EP-A-527520 as binder and a polysiloxane-polyether copolymer or polytetrafluoroethylene or a mixture thereof as lubricant in an amount of 0.1 to 10% by weight of the binder or binder mixture.

The support for the receiver sheet that is used with the dye-donor element may be a transparent film of e.g. polyethylene terephthalate, a polyether sulfone, a polyimide, a cellulose ester or a polyvinyl alcohol-co-acetal. The support may also be a reflective one such as baryta-coated paper, polyethylene-coated paper or white polyester i.e. white-pigmented polyester. Blue-coloured polyethylene terephthalate film can also be used as support.

To avoid poor adsorption of the transferred dye to the support of the receiver sheet or receiver element this support must be coated with a special surface, a dye-image-receiving layer, into which the dye can diffuse more readily. The dye-image-receiving layer may comprise, e.g. a polycarbonate, a polyurethane, a polyester, a polyamide, polyvinyl chloride, polystyrene-co-acrylonitrile, polycaprolactone or mixtures thereof. The dye-image receiving layer may also comprise a heat-cured product of poly(vinylchloride/co-vinylacetate/co-vinylalcohol) and polyisocyanate. Suitable dye-receiving layers have been described in e.g. EP 133011, EP 133012, EP 144247, EP 227094, EP 228066.

In order to improve the light-fastness and other stabilities of recorded images, UV absorbers, singlet oxygen quenchers such as HALS-compounds (Hindered Amine Light Stabilizers) and/or antioxidants can be incorporated into the receiving layer.

The dye layer of the dye-donor element or the dye-image-receiving layer of the receiver sheet may also contain a releasing agent that aids in separating the dye-donor element from the receiving sheet after transfer. The releasing agents can also be incorporated in a separate layer on at least part of the dye layer and/or of the dye-image-receiving layer. Suitable releasing agents are solid waxes, fluorine- or phosphate-containing surface-active agents and silicone oils. Suitable releasing agents have been described in e.g. EP 133012, JP 85/19138 and EP 227092.

The dye-donor elements according to the invention are used to form a dye transfer image, which process comprises placing the dye layer of the dye-donor element in face-to-face relation with the dye-image-receiving layer of the receiver sheet or receiver element and image-wise heating from the back of the dye-donor element. The transfer of the dye is accomplished by heating for about several milliseconds at a temperature of 400° C. When the process is performed for but one single color, a monochrome dye transfer image is obtained. A multicolor image can be obtained by using a dye-donor element containing three or more primary colour dyes and sequentially performing the process steps described above for each colour. After the first dye has been transferred, the elements are peeled apart. The above sandwich of dye-donor element and receiver sheet is formed on three occasions during the time when heat is applied by the thermal printing head. After the first dye has been transferred, the elements are peeled apart. A second dye-donor element (or another area of the dye-donor element with a different dye area) is then brought in register with the dye-receiving element and the process is repeated. The third colour and optionally further colours are obtained in the same manner. In addition to thermal heads, laser light, infrared flash or heated pens can be used as the heat source for supplying heat energy. Thermal printing heads that can be used to transfer dye from the dye-donor elements of the present invention to a receiver sheet are commercially available. In case laser light is used, the dye layer or another layer of the dye element has to contain a compound that absorbs the light emitted by the laser and converts it into heat e.g. carbon black.

Alternatively, the support of the dye-donor element may be an electrically resistive ribbon consisting of e.g. a multilayer structure of a carbon loaded polycarbonate coated with a thin aluminum film. Current is injected into the resistive ribbon by electrically adressing a printing head electrode resulting in highly localized heating of the ribbon beneath the relevant electrode. The fact that in this case the heat is generated directly in the resistive ribbon and that it is thus the ribbon that gets hot leads to an inherent advantage in printing speed using the resistive ribbon/electrode head technology compared to the thermal head technology, according to which the various elements of the thermal head get hot and must cool down before the head can move to the next printing position.

The following examples illustrate the invention in more detail without limiting, however, the scope thereof.

EXAMPLE 1

Synthesis of dye B.16

By way of example the preparation of the dyes B16, B32, B31, B61, A2, A42 and A30 is described. The dyes of table 1, 2 and 3 are all prepared in the same way and the starting materials can be prepared according to literature procedures known the those who are skilled in the art of organic synthesis.

Dye B16 is prepared according to scheme 1.

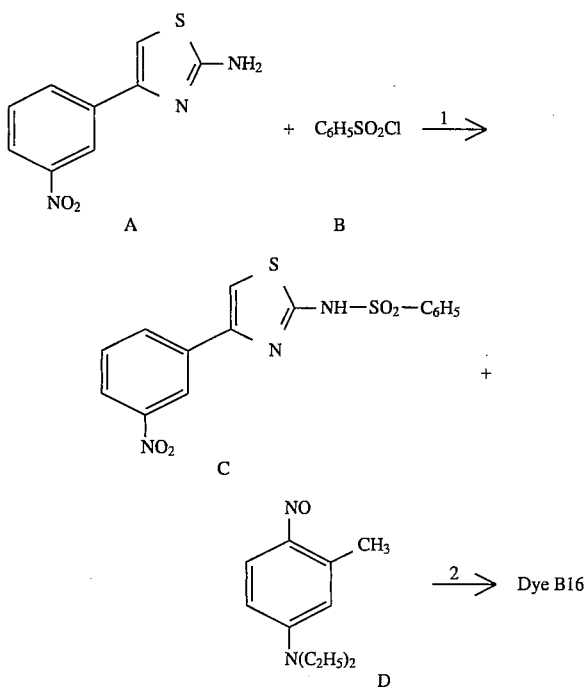

Step 1

19.4 g benzenesulfochloride (compound B) are added at 20° C. to a solution of 22.1 g of compound A in 80 ml of pyridine. The solution is stirred for 24 hours and poured into a solution of 250 ml of 5N HCl in 600 ml of water. The precipitate is filtered and washed with water. After crystallization from 200 ml of acetonitrile 24.3 g of compound C (mp. 175° C.) are obtained.

Step 2

22 ml of acetic anhydride are added at 20° C. to a suspension of 4 g of compound C and 2.13 g of compound D in 50 ml of ethyl acetate. The suspension is stirred for 4 hours at 20° C. The precipitate is filtered and recrystallized from 80 ml of acetonitrile to obtain 3.4 g of dye B.16 (mp. 217° C.).

EXAMPLE 2

Synthesis of dye A.30

Dye A.30 is prepared according to scheme 2.

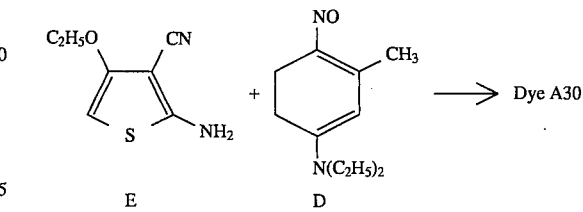

5.5 ml of acetic anhydride are added to a suspension of 8.5 g of compound E and 10.6 g of compound D in 100 ml of ethanol. The temperature is kept below 40° C. After 1 hour the precipitate is filtered, washed with ethanol and hexane. The product is dried and 5.1 g of dye A.30 are obtained (mp. 181° C.).

EXAMPLE 3

Synthesis of dye B.31

Dye B.31 is prepared according to scheme 3.

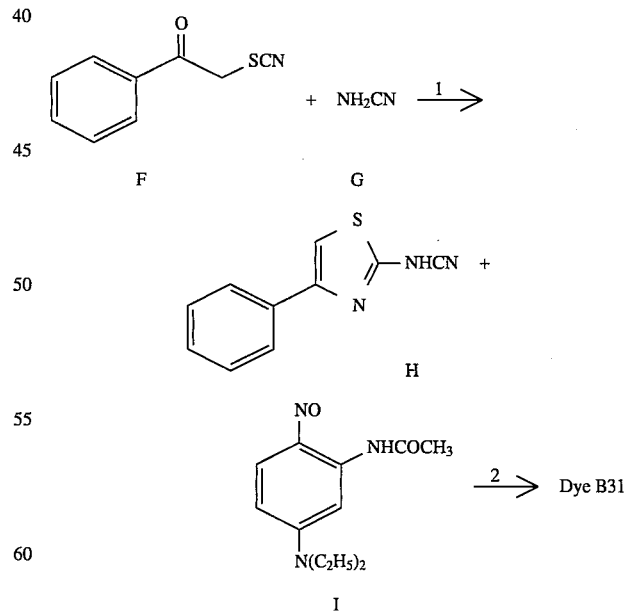

Step 1

13.8 ml of triethylamine are added in a solution of 17.7 g of compound F and 4.2 g of compound G in 200 ml of dichloromethane. The solution is refluxed for 4 hours. 4.2 g of compound G and 13.8 ml of triethylamine are added and reflux is continued for 2 hours. The solution is filtered and another 2.1 g of compound G and 6.9 ml of triethylamine are added and reflux is continued for 2 hours. After cooling and concentration the product is purified by crystallization from ethyl acetate. 8 g of compound H are obtained (mp. 190° C.).
Step 2

2 g of compound H and 2.3 g of compound I are disolved in 10 ml of acetonitrile and 10 ml of acetic anhydride. The reaction mixture is stirred for 15 minutes and the precipitate is filtered. After drying 3.7 g of dye B.31 are obtained (mp. 222° C.).

EXAMPLE 4

Synthesis of dye B,32

Dye B.32 is prepared according to scheme 4.

Scheme 4

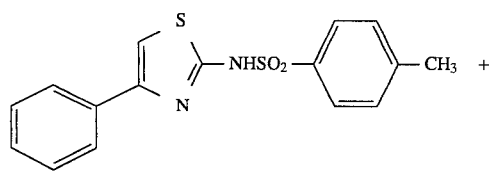

J

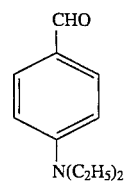

K 9.91 g of compound J (prepared analoguously as to compound C) and 5.85 g of compound K are suspended in 30 ml of acetic anhydride. The suspension is refluxed for one hour, cooled and diluted with 100 ml of methyl t-butyl ether and 100 ml of hexane. The organic solvent phase is removed and the oily residue is purified by column chromatography (dichloromethane/ethyl acetate (90/10)) to obtain 3 g of pure dye B.32.

EXAMPLE 5

Synthesis of dye B. 61

1.7 g of dye B.32 are dissolved in 20 ml of dimethylsulfoxide.

0.24 g of KCN are added and stirring is continued for two hours at room temperature.

0.5 g of N,N-dibromo-dimethylhydantoin (DDH) are dissolved in 1 ml of dimethylacetamid and added to the reaction mixture. After one hour the mixture is poured into 250 ml of water and extracted with ethyl acetate. The organic layer is dried and concentrated and the residue is purified by column chromatography to obtain 0.25 g of dye B.61.

EXAMPLE 6

Synthesis of dye A.2
Dye A.2 is prepared according to scheme 5

Scheme 5

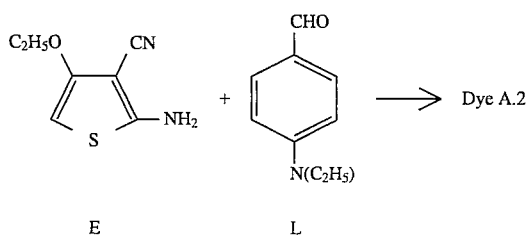

E  L 8 g of compound E and 8.5 g of compound L are dissolved in 200 ml of ethanol at 45° C. 19 ml of concentrated HCl are added and the reaction mixture is refluxed for 5 minutes. The mixture is poured into a mixture of 500 ml of water and 20 ml of ammonia (25%). After stirring for 30 minutes the precipitate is filtered and washed neutral with water. After drying 11.6 g of dye A.2 are obtained. The structure is confirmed by 1H-NMR and mass spectrum analysis.

EXAMPLE 7

Synthesis of dye A.42
Dye A.42 is prepared according to scheme 6

Scheme 6

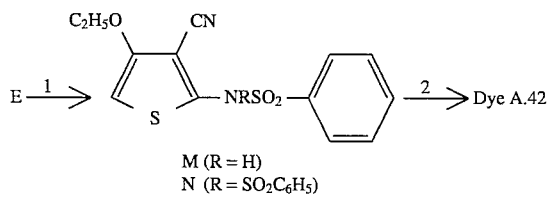

M (R = H)
N (R = $SO_2C_6H_5$)

33.7 g of compound E are dissolved in 400 ml of dichloromethane and 19.4 ml of pyridine under a $N_2$-atmosphere. 42.6 g of benzenesulphonyl chloride are added dropwise at room temperature. The reaction mixture is stirred for 30 hours. The mixture is filtered and washed with hexane. Hexane is added until precipitation starts. The product is filtered after 24 hours and dried. 21 g of a mixture of compounds M and N is obtained.

3.1 g of the mixture of compound M and N and 1.8 g of N,N-diethyl-para-aminobenzaldehyde are dissolved in 50 ml of toluene and 0.5 ml of pyridine. The reaction mixture is refluxed for one hour. After cooling 150 ml of hexane is added and stirring is continued for one hour. The product is filtered and dried to obtain 2.5 g of dye A.42.

EXAMPLE 8

Synthesis of dye A.19
12 g of the mixture of compounds M and N are dissolved in 100 ml of dichloromethane and 4.8 ml of pyridine under a $N_2$-atmosphere. 7.2 g of para-N,N-diethylamino-nitrosobenzene are added. The reaction proceeds exothermally. After 4 hours the mixture is filtered and concentrated under reduced pressure. The residue is purified by column chromatography (element:dichloromethane/ethyl acetate; 95/5). 1.3 g of pure dye A.19 are obtained.

EXAMPLE 9

The absorption maxima ($\lambda_{max}$) and molar extinction coefficients ($\epsilon$) of some dyes identified below were determined in dichloromethane unless otherwise stated. The results are listed in table 4.

TABLE 4

| Dye | $\lambda_{max}$ (nm) | $\epsilon$ (mol$^{-1}$ cm$^{-1}$ l) |
| --- | --- | --- |
| B.8 | 630 | 39846 |
| B.15 | 658 | 44356 |
| B.16 | 666 | 44790 |
| B.19 | 648 | 63490 |
| B.20 | 626 | 37703 |
| B.21 | 642 | 41578 |
| B.22 | 638 | 37902 |
| B.31 | 664 | 69168 |
| B.32 | 576 | 69974 |
| A.30 | 588 | 27979 |
| A.29 | 570 | 29774 |
| B.68 | 638 | 38495 |
| B.23 | 648 | 41774 |
| B.27 | 638 | 38196 |
| B.69 | 642 | 39103 |
| A.19 | 574 | 38248 |
| B.18 | 672 | 65349 |
| A.42 | 538 | 67087 |
| B.62 | 645 | 45456 |
| B.25 | 630 | 38049 |
| B.49 | 640 | 40055 |
| B.51 | 640 | 37320 |
| B.50 | 650 | 41579 |
| B.7 | 612 | 36243 |
| B.11 | 635 | 57838 |
| B.61 | 656 | 36811 |
| A.30 | 588 | 27979 |
| A.29 | 570 | 29774 |

EXAMPLE 10

Receiver sheets were prepared by coating a subbed polyethylene terephthalate film having a thickness of 175 μm with a dye-image-receiving layer from a solution in ethyl methyl ketone of 3.6 g/m² of poly(inyl chloride/co-vinyl acetate/co-vinyl alcohol). (Vinylite VAGD supplied by Union Carbide), 0.435 g/m² of polyisocyanate (Desmodur N75 supplied by Bayer AG), and 0.2 g/m² of hydroxymodified polydimethylsiloxane (Tegomer H SI 2111 supplied by Goldschmidt).

Dye-donor elements for use according to thermal dye sublimation transfer were prepared as follows.

A solution in methyl ethyl ketone of 0.5% by weight of dye and 0.5% by weight of poly(styrene-co-acrylonitrile) (PSA) (Luran 388s, supplied by BASF Germany) as a binder was prepared.

A dye layer having a wet thickness of 100 μm was coated from this solution on a polyethylene terephthalate film support having a thickness of 6 μm and carrying a conventional subbing layer. The resulting dye layer was dried by evaporation of the solvent. The opposite side of the film support was coated with a subbing layer of a copolyester comprising ethylene glycol, adipic acid, neopentyl glycol, terephthalic acid, isophthalic acid, and glycerol. The resulting subbing layer was covered with a solution in methyl ethyl ketone of 0.5 g/m² of a polycarbonate having the following structural formula to form a heat resistant layer:

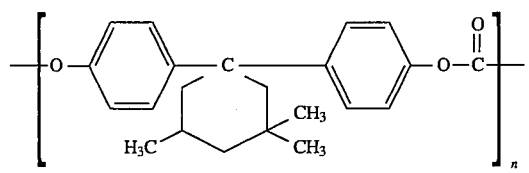

wherein n has a value giving a polycarbonate with a relative viscosity of 1.295 (measured in a 0.5% by weight solution in dichloromethane).

Finally, a top layer of polyether-modified polydimethylsiloxane (Tegoglide 410, Goldschmidt) was coated from a solution in isopropanol on the resulting heat-resistant polycarbonated layer.

The dye-donor element was printed in combination with a receiver sheet in a Mitsubishi colour video printer CP100E.

The receiver sheet was separated from the dye-donor element and the colour density value of the recorded image was measured in reflex by means of a Macbeth TR 924 densitometer in the red, green, and blue regions in status A mode.

The above described experiment was repeated for each of the dyes identified in table 5 hereinafter. The results are also given in table 5.

TABLE 5

| Dye no. | Max. density | Spectral absorption in Status A filter behind | | |
| --- | --- | --- | --- | --- |
| | | Red | Green | Blue |
| B.32 | 112 | 84 | 112 | 16 |
| B.22 | 212 | 150 | 35 | 21 |
| B.21 | 190 | 150 | 34 | 21 |
| B.20 | 192 | 150 | 44 | 21 |
| A.29[a] | 241 | 124 | 150 | 29 |
| A.30[a] | 226 | 150 | 127 | 26 |
| B.69 | 140 | 140 | 30 | 21 |

[a]Desmodur N75 was replaced by Desmodur VL (0.336 g/m²) as a hardener in the receiving layer of the receiver sheet.

I claim:

1. Dye donor element comprising on a support a dye layer, said dye layer comprising a binder and a dye according to formula (I):

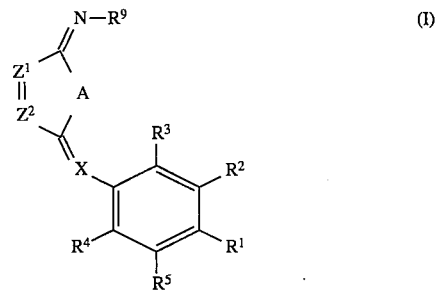

wherein $Z^1$ and $Z^2$ each independently represent N or $CR^6$;

A represents O, S or $NR^7$;

X represents N or $CR^8$—$(CR^{16}=CR^{17})_n$ wherein n is 0 or 1;

$R^2$, $R^3$, $R^4$ and $R^5$ each independently represent hydrogen, an alkyl, a cycloalkyl, an aryl, an alkylthio, an amino, an alkyloxy, an aryloxy, a carbonamido, a sulfamido, a hydroxy, a halogen, CN, $NO_2$, $NH-SO_2R^{10}$, $NH-COR^{10}$, $O-SO_2$, $O-COR^{10}$ or $R^2$ and $R^3$ together with the atoms to which they are attached or $R^4$ and $R^5$ together with the atoms to which they are attached represent the necessary atoms to form a ring;

$R^1$ represents $OR^{11}$, $SR^{11}$ or $NR^{12}R^{13}$;

$R^{11}$ represents hydrogen, an alkyl, a cycloalkyl or an aryl;

$R^{12}$ and $R^{13}$ each independently represents hydrogen, an alkyl, a cycloalkyl, an aryl, a heterocyclic ring or $R^{12}$ and $R^{13}$ together with the atoms to which they are attached represent the necessary atoms to form a heterocyclic ring or $R^{12}$ or $R^{13}$ together with $R^2$ or $R^5$ together with the atoms to which they are attached represent the necessary atoms to form a heterocyclic ring;

$R^6$ represents hydrogen, a hydroxy, a thiol, an oxycarbonyl group, an oxysulfonyl group, CN, $NO_2$, a halogen, an alkoxy, an aryloxy, an alkylthio, a carboxylic ester, a carbonamido group, an alkyl, an aryl, a cycloalkyl, a sulfonamido group, an amino, a heterocyclic group, an acylamino or a sulfonyl amino;

$R^7$ represents hydrogen, an alkyl, an aryl, a cycloalkyl, an acyl group, a sulfonyl group or a heterocyclic group;

$R^8$ represents hydrogen, cyano, an alkyl, a cycloalkyl, an aryl, a heterocyclic ring, an alkoxy, an alkylthio, an aryloxy, a halogen, $SO_2R^{10}$, $COR^{10}$, $CSR^{10}$ $POR^{10}R^{14}$ or $R^8$ and $R^3$ or $R^8$ and $R^4$ together with the atoms to which they are attached represent the necessary atoms to form a ring;

$R^9$ represents hydrogen, cyano, an aryl, an alkyl, a cycloalkyl, $SO_2R^{10}$, $COR^{10}$, $CSR^{10}$, $POR^{10}R^{14}$ or $COCOR^{10}$;

$R^{10}$ and $R^{14}$ each independently represents an alkyl, a cycloalkyl, an aryl, an alkenyl, an alkyloxy, an aryloxy, an alkylthio, an arylthio, an amino, a heterocyclic ring or $R^{10}$ and $R^{14}$ together with the atoms to which they are attached represent the necessary atoms to form a ring;

$R^{16}$ and $R^{17}$ each independently represents hydrogen, cyano, an alkyl, a cycloalkyl, an aryl, a heterocyclic ring, an alkoxy, an alkylthio, an aryloxy, a halogen, $SO_2R^{10}$, $COR^{10}$, $CSR^{10}$ $POR^{10}R^{14}$ or $R^{16}$ and $R^3$ or $R^{17}$ and $R^3$ or $R^{16}$ and $R^4$ or $R^{17}$ and $R^4$ together with the atoms to which they are attached represent the necessary atoms to form a ring.

2. A dye donor element according to claim 1 wherein said dye corresponds to the following formula (II):

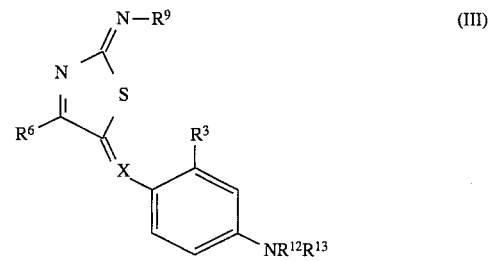

(II)

wherein $R^6$, $R^9$, $R^3$, $R^{12}$ and $R^{13}$ have the same meaning as defined in general formula (I) of claim 1 and $R^{15}$ represents hydrogen, a hydroxy, a thiol, an oxycarbonyl group, an oxysulfonyl group, CN, $NO_2$, a halogen, an alkoxy, an aryloxy, an alkylthio, a carboxylic ester, a carbonamido group, an alkyl, an aryl, a cycloalkyl, a sulfonamide, an amino, a heterocyclic group, an acylamino or a sulfonyl amino.

3. A dye donor element according to claim 1 wherein said dye corresponds to the following formula (III):

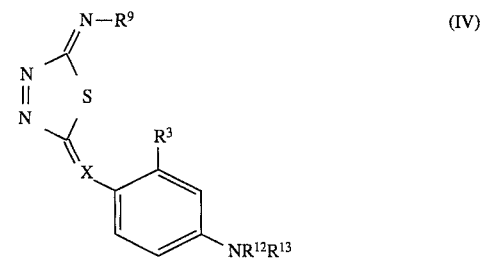

(III)

wherein $R^6$, $R^9$, $R^3$, $R^{12}$ and $R^{13}$ have the same meaning as defined in general formula (I) of claim 1.

4. A dye donor element according to claim 1 wherein said dye corresponds to one of the following general formula (IV) to (VII):

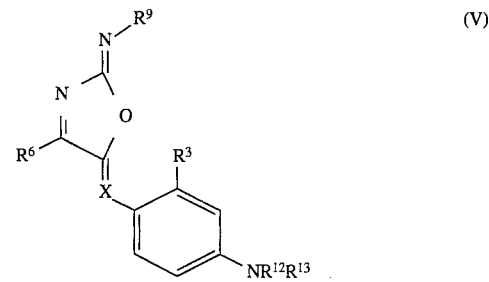

(IV)

(V)

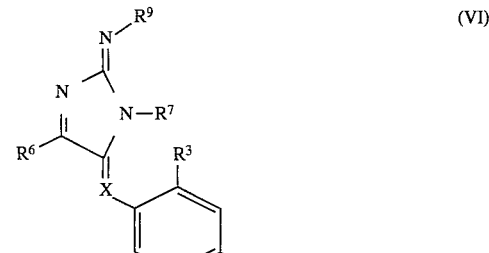

(VI)

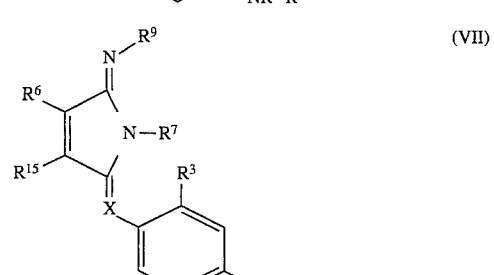

(VII)

wherein $R^3$, $R^{12}$, $R^{13}$, $R^6$, $R^7$ and $R^9$ have the same meaning as defined in general formula (I) of claim 1 and wherein $R^{15}$ has the same meaning as defined in claim 2.

5. A method for making an image according to the thermal dye transfer process comprising the steps of:

placing the dye layer of a dye donor element as defined in any of claims 1 to 4 in face-to-face relationship with an dye-image receiving layer of a receiver sheet:

image-wise heating a thus obtained assemblage and separating said receiver sheet from said dye donor element.

* * * * *

UNITED STATES PATENT AND TRADEMARK OFFICE
CERTIFICATE OF CORRECTION

PATENT NO. : 5,565,403
DATED : October 15, 1996
INVENTOR(S) : Luc Vanmaele

It is certified that error appears in the above-identified patent and that said Letters Patent is hereby corrected as shown below:

Column 2, line 41, "O-$SO_2{}^{10}$" should read --O-$SO_2R^{10}$--;

Column 10, TABLE 2-continued, Dye B44, under heading $R^9$, "$SO_2C_6H_5$" should read --$SO_2CH_3$--;

Column 19, line 67, "inkier" should read --inkjet--;

Column 20, line 55, "Nos." should read --No.--;

Column 20, line 62, "Nos." should read --No.--;

Column 22, line 65, "In addition ..." should start a new paragraph;

Column 29, line 3, "O-$SO_2$" should read --O-$SO_2R^{10}$--;

Column 29, line 48, "$SO_{2R}10$" should read --$SO_2R^{10}$--.

Signed and Sealed this

Twenty-ninth Day of July, 1997

Attest:

BRUCE LEHMAN

*Attesting Officer*   *Commissioner of Patents and Trademarks*